No. 733,073. Patented July 7, 1903.

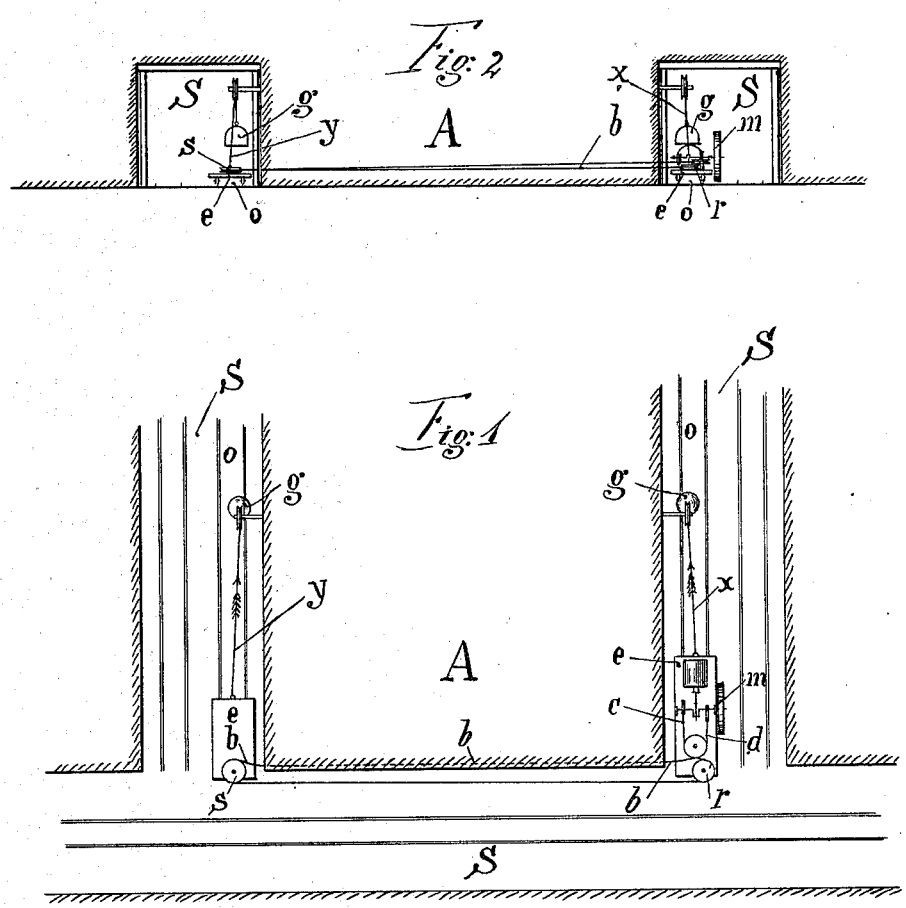

UNITED STATES PATENT OFFICE.

HUBERT VALENTIN NEUKIRCH, OF ZWICKAU, GERMANY.

MEANS FOR CUTTING COAL, &c.

SPECIFICATION forming part of Letters Patent No. 733,073, dated July 7, 1903.

Application filed January 8, 1901. Serial No. 42,555. (No model.)

*To all whom it may concern:*

Be it known that I, HUBERT VALENTIN NEUKIRCH, a subject of the Emperor of Germany, residing at Zwickau, Saxony, Germany, have invented certain new and useful Improvements in Means for Cutting Coal and the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Numerous machines have heretofore been invented for the purpose of taking the place of hand pickwork, in the use of which machines more or less difficulty has been experienced; and the object of this invention is to provide an acceptable machine for this purpose.

With this object in view the invention consists in the improved construction, arrangement, and combination of parts hereinafter fully described and afterward specifically claimed.

The invention is illustrated by the accompanying drawings, in which—

Figure 1 shows a plan view of a working, and Fig. 2 a section of the same.

A is the face of the working, across which runs a saw band or chain provided with cutting edge $b$. At the free ends of such chain are secured the wire ropes $c$ and $d$, passing around rollers or pulleys $r$ and $s$, as indicated by the arrows, mounted on carriages $e$ $e$. The latter run on rails $o$, laid in the galleries S. On the one carriage $e$ is mounted the driving machinery $m$, (rotary or cylinder machine,) which imparts a reciprocating motion to the saw web or chain either directly or by means of intermediate gearing.

$g$ $g$ represent weights secured to the carriages by means of ropes $x$ $y$, whereby the carriages and driving machinery are slowly advanced in the direction of work, so that the tool may be borne either more or less firmly against the face of the working A, according to the nature of the coal. Cutting can thus go on uninterruptedly, even though the working may be carried hundreds of yards into the seam, for it is wholly unnecessary to stop the machinery or even remove it when the undercut coal is to be knocked off or brought out.

If the timber supports in the galleries S on advance of the cutting machinery impede the work, then supports must be erected on the opposite side of the machinery on the advance of the latter, whereupon the obstructing supports may be removed without the machinery having to be stopped.

Having now described my invention, what I claim as new, and desire to secure by Letters Patent, is—

In coal-mining machinery the combination with a tool adapted to operate across the face of the working, cars in side galleries, a motor on one of the cars, a pulley on each car, a cord around the two pulleys and carrying the tool, a double-crank shaft, connections between the cranks and the tool, and a pulley and weighted cord for each car for drawing the cars into the galleries, substantially as described.

In witness whereof I have hereunto signed my name, this 13th day of December, 1900, in the presence of two subscribing witnesses.

HUBERT VALENTIN NEUKIRCH. [L. S.]

Witnesses:
 M. L. SAWTER,
 ALFRED FERBER.